United States Patent Office 2,801,098
Patented July 30, 1957

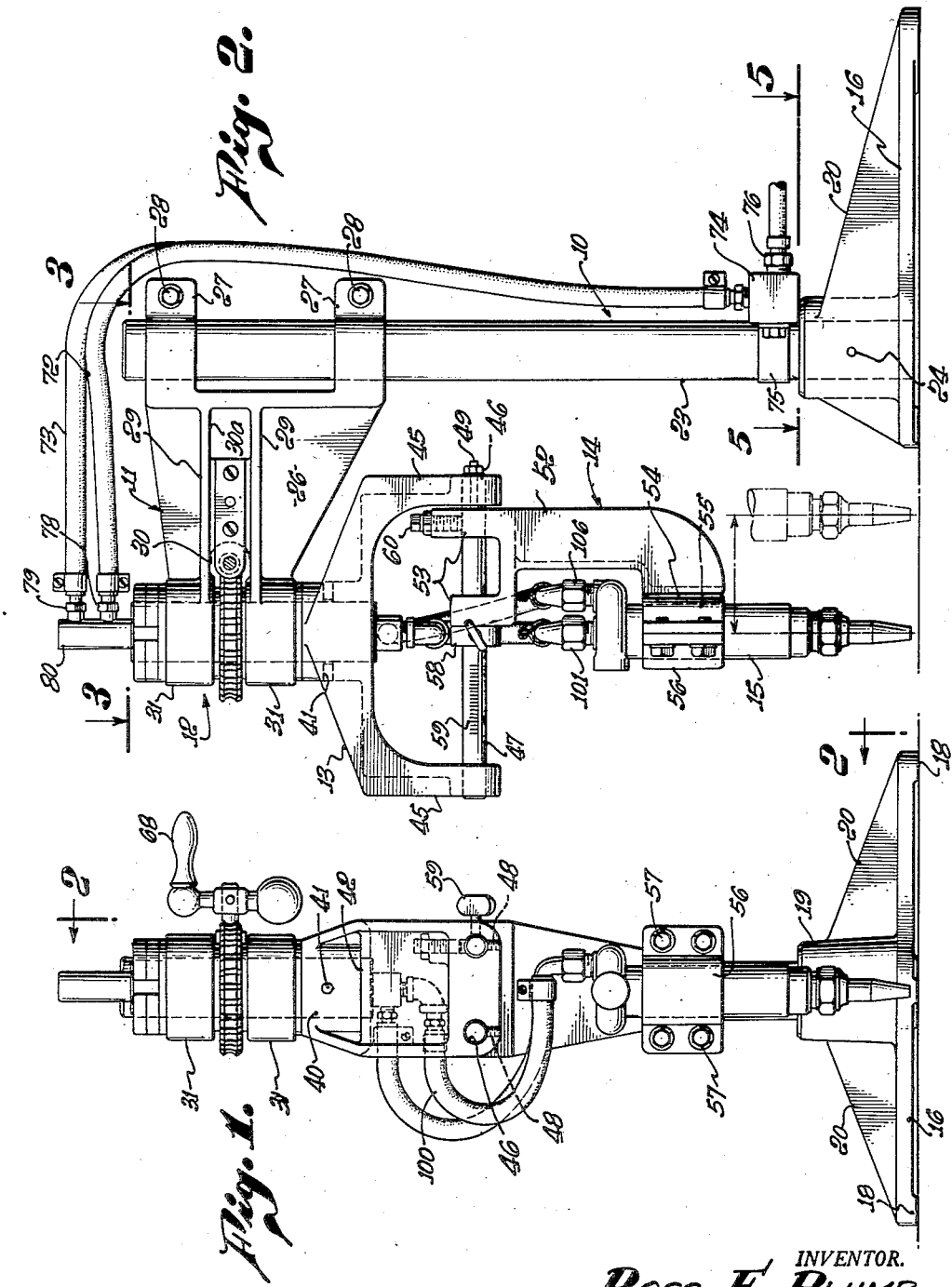

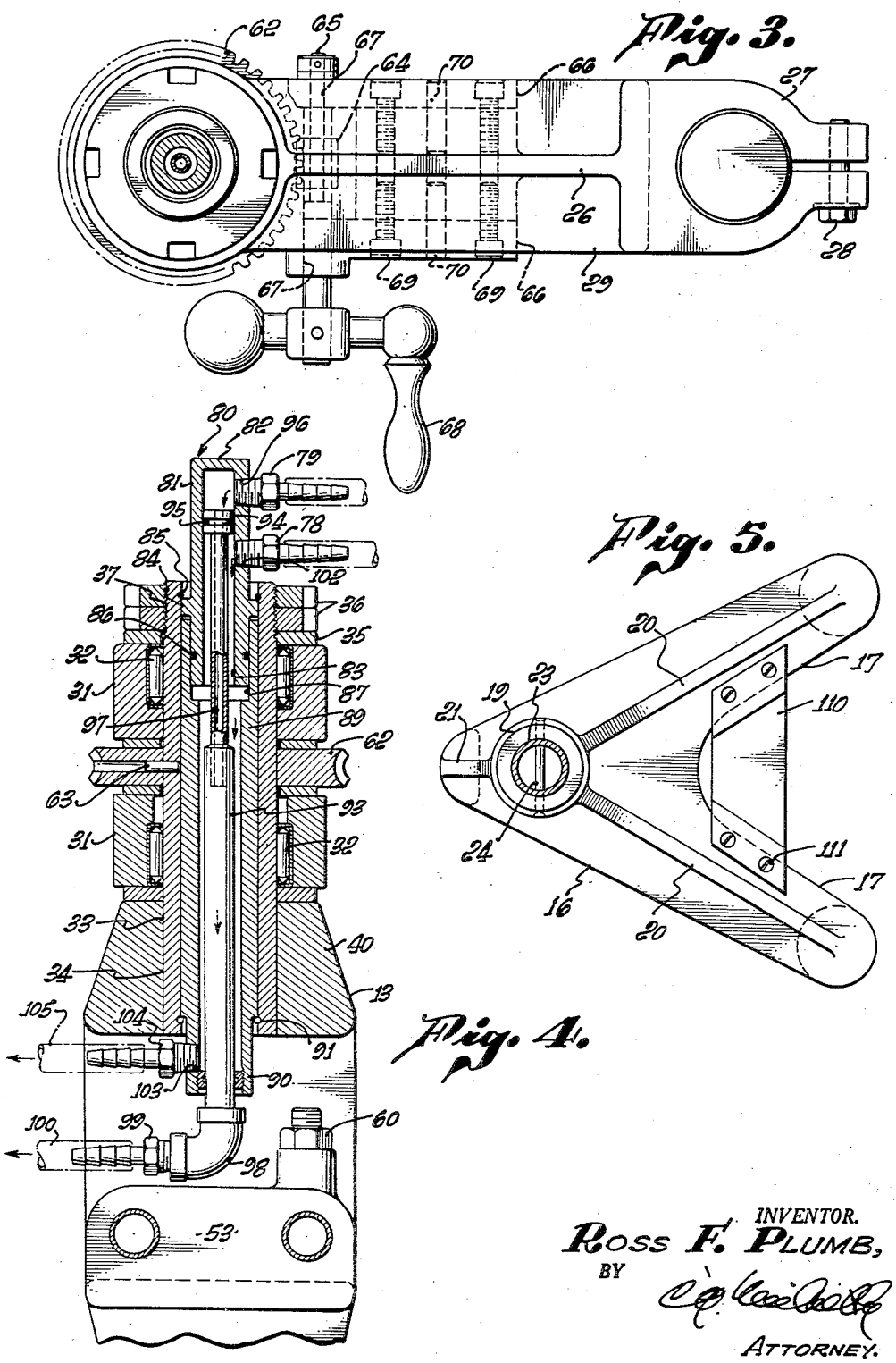

2,801,098

PORTABLE APPARATUS FOR BURNING CIRCULAR HOLES IN METAL

Ross F. Plumb, Los Angeles, Calif.

Application February 5, 1953, Serial No. 335,193

3 Claims. (Cl. 266—23)

This invention relates to an apparatus for cutting holes in metal plate and more particularly to a portable, lightweight hole burning apparatus which is easily carried about a job site, as for example, a ship building yard.

In sheet or light plate metal, holes may be punched or stamped conveniently out of the metal by well-known mechanical punching machines. Such punching operations were feasible when the holes could be prelocated, arranged in similar manner, and then punched in large numbers. Such a method was impracticable when holes were required to be selectively located and made on a job site.

In heavy plate, mechanical hole-punching machines were not practicable because of the large size and tremendous pressures required. In heavy plate, holes were easily burned out of the metal by means of a hand-operated and hand-held cutting torch of well-known type, as for example, an oxygen acetylene torch. The hand-held torch was convenient in that it could be moved to any location on a job site. This facility was particularly advantageous in ship building construction and other heavy construction employing heavy metal plate. However, cutting of holes by use of a hand-held torch depended entirely upon the skill of the workman and were likely to be inaccurate in dimension, to have rough uneven edges, and to cause undesired flow of metal at the edge margins of the hole being burned. A true circle was extremely difficult to burn in metal plate by a hand-held torch.

This invention contemplates a lightweight, portable apparatus readily adapted to be moved to virtually any location on a job site and which is capable of controllably and movably supporting a cutting torch so that the path of the cutting torch when positioned over a metal plate will quickly and conveniently cut an accurate, preselected, predimensioned hole therein.

It is therefore the primary object of this invention to design and provide a lightweight, compact, portable apparatus adapted to carry a cutting torch which is capable of burning in metal plate accurately dimensioned holes of selected size.

An object of this invention is to design and provide a lightweight, portable apparatus for controlling movement of a cutting torch for burning circular holes in horizontal, vertical or inclined metal plate.

A further object of this invention is to design and provide an improved apparatus for cutting holes in metal plate wherein the apparatus may be quickly and accurately centered with respect to a hole to be cut and may be readily adjusted to cut a hole of selected diameter.

Still another object of this invention is to design and provide a portable, lightweight apparatus for making holes in metal plate wherein a rotatably driven head member is mounted for rotation about a normally vertical axis and wherein said head member adjustably carries a cutting torch in laterally spaced relation to the axis of rotation for cutting a hole of selected diameter.

Still another object of this invention is to design and provide an apparatus as above-described wherein the means for supporting the rotatable head member and the carrier means is so arranged that the fuel for the cutting torch is supplied along the axis of rotation of the head.

This invention contemplates a torch carrier means which is slidably mounted on a normally horizontal way which is provided with indicia for easily determining the position of the carrier means for cutting a hole of selected diameter.

A still further object of this invention is to design and provide an apparatus as above-described wherein the means for supporting the rotatable head member and carrier means may include holding elements for mounting the rotatable head in a selected position for cutting holes in vertical or inclined metal plate, such means including magnetic means adapted to magnetically hold the apparatus in fixed selected position on metal plate.

Generally speaking, this invention contemplates an apparatus wherein a base is provided with an upstanding standard which carries laterally and horizontally projecting arm means adjacent the top end thereof. The arm means are provided with spaced bearing means defining a vertical axis of rotation and receive a shaft connected at its lower end to a depending rotatable yoke-shaped or bifurcated head member. The bifurcated head member includes a pair of parallel horizontally disposed spaced rods which form ways for selectively slidably and adjustably mounting a carrier member which may be accurately positioned thereon for the diameter of hole to be cut. The carrier member includes means provided at its lower end for supporting a torch means of well-known type so that when the carrier member and head member are rotated about said vertical axis, the path of the cutting flame of the torch will accurately and truly cut a circular hole in metal plate being worked upon.

Other objects and advantages of this invention will be readily apparent from the following description of the drawings in which an exemplary embodiment of this apparatus is shown.

In the drawings:

Fig. 1 is a front elevational view of an apparatus embodying this invention.

Fig. 2 is a side elevational view of the apparatus shown in Fig. 1 taken from the planes indicated by line II—II of Fig. 1.

Fig. 3 is a sectional view taken in a horizontal plane indicated by line III—III of Fig. 2.

Fig. 4 is an enlarged fragmentary sectional view of bearing means carried by the laterally extending arm means, the section being taken in a vertical plane bisecting said bearing means.

Fig. 5 is a view taken from the plane indicated by line V—V of Fig. 2, and illustrates magnetic means which may be employed to position and hold the apparatus on vertical surfaces if desired.

Referring to the drawings, an exemplary apparatus embodying this invention for burning or cutting holes of selected diameter in metal plate generally comprises a standard 10 carrying at its upper end horizontally projecting arm or support means 11 provided at its outer end with bearing means generally indicated at 12. Within bearing means 12 is rotatably mounted a depending yoke-shaped or bifurcated head member 13 which carries an off-set torch carrier means 14. A torch 15 carried by the carrier means 14 may be of any selected well-known make and manufacture, and is preferably shortened in length.

The standard 10 may comprise an integrally cast V-shaped base 16 having divergent legs 17 provided with feet 18. At the apex of the V-shaped base may be formed an upstanding cylindrical socket housing 19.

Tapering ribs 20 extend between the socket housing 19 and the outer ends of legs 17 for reinforcing the housing 19. A reinforcing flange 21 extends from the apex of the outer margins of the legs to the socket 19. Inserted into the socket housing 19 may be the bottom end portion of a post 23 which may be secured therein against rotation by a through pin 24. The post may be of any suitable height and may comprise a hollow tube.

Means for carrying the rotatable yoke-shaped head member 13 is provided by integrally cast arm means 11 which includes a vertically disposed generally traingular-shaped web member 26 carrying at its widest portion a pair of vertically spaced horizontally disposed clamps 27 adapted to receive the upper end portion of post 23. The clamps are secured thereon at a selected height by screw bolt assemblies 28. The member 26 is integrally formed with a pair of vertically spaced, centrally disposed longitudinally extending horizontal reinforcing walls 29 forming horizontal recesses on opposite sides of the member 26. The portion of member 26 lying between the walls 29 may be provided with spaced openings 30 and 30a for lightening the web member.

At the outer end of the arm means 11 may be provided the bearing means 12 which may include vertically spaced bearing housings 31. Each bearing housing 31 may carry suitable antifriction means shown in this example as needle bearings 32 for rotatably supporting a tubular shaft 33 secured as by a tight-fit at 34 to the rotatable yoke-shaped head member 13. The rotatable shaft 33 may be supported against downward thrust or weight by a brass washer 35 seated on the top annular margin of the top bearing housing 31 and by a pair of nuts 36 threaded as at 37 to the top end of the shaft 33 and bearing on washer 35.

The rotatable head member 13 includes a top central ported hub 40 which receives the lower end of the tubular shaft 33 and which is secured thereto as by threaded pins 41. The hub is centrally carried by a reinforced horizontally extending web member 42 which supports at its extremities a pair of depending U-section legs 45. The depending legs 45 may be spaced apart a suitable selected distance, depending upon the various diameters of holes to be cut by the torch as will be later described.

The lower ends of said legs 45 may be provided with laterally spaced, aligned ports 46 adapted to receive therein ends of parallel transverse tubular members or rods 47 which provide parallel ways upon which torch carrier 14 may be slidably adjustably mounted. The rods 47 may be removably secured by set screws 48 carried at the bottom of one leg 45. The other leg 45 may carry a horizontally disposed adjustment screw 49 located between ports 46 and arranged to align the torch carrier 14 with a hole center as later described.

The torch carrier 14 includes a depending U-section portion 52 carrying at its upper end a pair of horizontally spaced lugs 53 of thick section provided with pairs of spaced aligned ports to slidably receive the rods 47. The portion 52 terminates in a laterally off-set lower end portion 54 which is provided with an arcuate, semicircular, outwardly facing recess 55 adapted to receive a cylindrical body portion of torch 15. The torch 15 may be secured in the recess 55 by a separable C-shaped clamping member 56 secured to the bottom portion 54 by means of spaced screw bolt assemblies 57.

The axis of the torch 15, when clamped in the carrier 14, may be accurately aligned with the axis of rotation of head member 13 by positioning the upper end of the carrier against the horizontal positioning screw 49, the inner end of the positioning screw being adapted to bear upon the outer surface of the adjacent lug 53. Screw 49 may then be adjusted until the axis of the torch is aligned with the axis of head member 13 or shaft 33. The screw 49 may then be locked in this position. Thereafter contact of the carrier member with screw 49 will at once determine axial alignment of the torch with respect to its axis of rotation. Thus when the torch nozzle tip is positioned over the center of a hole to be cut, the torch is centered on the hole to be cut.

The carrier means 14 may be positioned on rods 47 by selected positioning of ported stop element 58 slidably movable along one rod 47 to a selected radius of hole to be burned. Radii of holes to be selected may be indicated on the said one rod 47 by a plurality of spaced suitable indicia 59 marked thereon. When the stop element 58 has been positioned and secured by set screw 59 at the desired radius of hole to be burned, as indicated by the indicia, carrier means 14 may be moved along rods 47 until the adjacent lug 53 tightly abuts stop element 58. The carrier 14 is slidably frictionally held in position on rods 47 between stop element 58 and a leg 45 by means of a spring-loaded stud and lock nut assembly 60 carried above the said one rod 47 by an upstanding partial extension of the outer lug 53.

Means for rotating head member 13 and the torch 15 supported thereby may be provided by a circular gear element 62 positioned between bearing housings 31 and keyed to shaft 33 as at 63. The gear element 62 may be driven by a suitable drive gear element 64 carried on a stepped shaft 65 which extends through the adjacent opening 30 in web 26 and is supported by a pair of elongated mounting members 66 carried on opposite sides of a centrally thickened section of the web between walls 29. Each mounting member 66 is provided with a journal portion 67 adapted to rotatably mount shaft 65, the outer end of the enlarged section of the stepped shaft 65 being connected to a crank handle 68 to facilitate manual rotation of the drive gear element 64.

The mounting member 66 may be secured to the web member 26 as by means of laterally spaced socket head cap screws 69 and an intermediate positioning dowel 70.

Means for supplying fuel such as compressed air and acetylene gas to torch 15 during rotation and without entanglement of the conduits therefor may comprise a pair of flexible supply tubes 72 and 73 connected to a fitting 74 carried by a bracket 75 on the post adjacent to the base. The fitting 74 provides suitable nipple means 76 for connecting supply hoses to the apparatus. The tubes 72 and 73 extend along the post and over the arm means 11 for connection as by suitable fittings at 78 and 79 to a stationary non-rotatable connector means generally indicated at 80 carried within the upper end portion of the shaft 33. The connector means 80 includes a hollow tubular member 81 having a top end wall 82 and an open bottom end 83. The member 81 is provided with an external intermediate annular outwardly extending shoulder 84 disposed within the upper open end of shaft 33 and retained therein by cooperation of a securing ring 85 of any suitable material with an annular groove in the inner surface of the shaft 33. The lower portion of the member 81 is received within an upper enlarged chamber 87 of an inner rotatable hollow sleeve member 89. A seal between member 81 and chamber 87 may be provided by suitable O-ring seal means 86. The sleeve member 89 has a reduced bottom end portion 90 extending below the lower end of shaft 33. The shoulder formed by the reduced end portion affords a securing means with a cooperable annular ring and groove means at 91 to position sleeve member 89.

Carried within the tubular member 81 and extending through the sleeve member 89 is a rotatable hollow tube 93, the tube being provided with a head 94 in tubular member 81 below the inlet port 96 of the fitting 79 and sealed as by O-ring means 95. Thus, compressed air, for example, from hose 73 may flow through the passageway 97 provided in the tube 93, the enlarged lower end of said passageway being connected by an elbow 98 and a fitting 99 to a connecting hose 100 which is attached at its other end to a suitable inlet fitting 101 provided on torch 15.

An inlet port 102 for fitting 78 is provided in tubular member 81 below head 94 and acetylene gas, for example, may flow through the passageway provided by tubular member 81 and the hollow portion of sleeve member 89 to the reduced end portion 90. An outlet port 103 provided in portion 90 leads to a fitting 104 which may be connected to a hose 105 which leads to an inlet fitting 106 on torch 15.

When the head member 13 is rotated to move a torch carried thereby in a circular path of selected diameter, the hoses 100 and 105 turn with and follow the rotating head member. The feed hoses 72 and 73 remain stationary, relative rotation occurring in the connector means 80 between the member 89 and member 81. Thus, there is no entanglement or twisting of the several hoses employed to supply fuel to the cutting torch.

In the embodiment illustrated, it is apparent that an efficient effective torch-holding apparatus is provided for accurately burning circular holes and is readily adapted for use on metal plate lying in horizontal planes or plate lying at relatively small angles of inclination to the horizontal. When a hole is desired to be cut in a vertically disposed metal plate or one having steep inclination, the base may be provided with a shoe or block 110 of either permanently magnetized material or electrically magnetized elements energized by suitable well-known electrical means. The magnetized shoe may be attached to the base 16 in any suitable manner as by readily removable screw attaching means 111. Since the apparatus is of very light weight (approximately 18 to 20 pounds when fully equipped for operation), it may be readily lifted and positioned on a vertical metal plate with respect to the center of a hole to be cut therein and held thereagainst in selected position by the magnetized shoes. It is thus possible to burn out holes of desired diameter in bulkheads of a ship, for example, in an accurate convenient manner.

In order to properly control the flow of melted metal during cutting so that an edge face of the circular opening being cut lies at virtually right angles to the plane of the plate, the nozzle tip of torch 15 may be of swivel-type so as to adjustably direct the cutting flame at a suitable selected angle the circular path of the nozzle tip so that melted metal will flow and will be displaced in desired manner. It is understood that this invention contemplates that the entire torch 15 may be adjustably carried by a convenient swivel connection to the carrier means instead of the fixed clamping means illustrated in order to permit the entire torch to lie with its axis in selected inclined relation to the metal plate being cut.

In order to accommodate different sizes of nozzle tips, the torch 15 may be readily vertically raised or lowered by loosening clamp 56. It is understood other suitable means, such as a rack and gear may also be used for this purpose. While a manually operated handle is shown for rotating the head member 13, other means such as an electrically driven means may be employed.

The lightweight portable compact apparatus of this invention thus affords an effective means for mounting and holding a cutting torch in selected position and moving the torch in a circular path of selected diameter. The apparatus may be quickly aligned with respect to the center of a hole to be cut in metal plate, may be quickly and accurately adjusted to a selected diameter of hole to be cut and may then be controllably moved in the selected circular path.

It is understood that various modifications and changes may be made in the apparatus of this invention above described which may come within the spirit of this invention, and all such changes and modifications coming within the scope of the appended claims are embraced thereby.

I claim:

1. In a portable, lightweight apparatus for burning circular holes in metal plate, the combination of: carrier means adapted to support a torch-cutting means having a selectively directed cutting flame; a bifurcated support means for the carrier means adapted to be rotated about an axis normally lying virtually parallel to the normal direction of the flame of the cutting means; means on the bifurcated support means to adjustably position the carrier means with respect to said axis for selectively varying the radius of the hole to be cut, said carrier means in one position aligning the cutting means with said axis of rotation to center the bifurcated support means with respect to a hole to be cut; means for rotating the support means about said axis; means for feeding fuel to the cutting means along the axis of rotation of the support means, said fuel-feeding means including a rotatable hollow shaft means supporting said bifurcated support means and provided with an outlet port; an inner tubular member having a passageway therein and an outlet port for said passageway coaxially aligned within said shaft means; and a hollow non-rotatable member carried by the shaft means and extending within the upper end thereof, said non-rotatable member having a pair of longitudinally spaced inlet ports, said inner tubular member extending into said non-rotatable member and having a sealing head between said inlet ports.

2. A portable, lightweight apparatus adapted to carry torch means for burning circular holes in metal, comprising: a standard; a rotatable hollow shaft supported by the standard in spaced relation thereto; a downwardly open yoke means including depending yoke elements carried by the lower portion of said shaft; a carrier member for a torch means adjustably mounted in said yoke means and positionable to axially align a torch means carried thereby with the axis of rotation of the hollow shaft whereby said torch means serves to align the axis of rotation of the torch with a center on a work piece; means for conducting fuel to a torch means carried by the carrier member including a non-rotatable hollow member provided with spaced ports adapted to be connected to a fuel supply source and coaxially mounted on said hollow shaft; and an inner tubular member extending within said hollow shaft and into said non-rotatable member and having a passageway therein, said inner tubular member having a sealing head positioned between said spaced ports, said shaft and said inner tubular member being provided with outlet ports and being rotatable together.

3. In a portable, compact, lightweight apparatus for burning circular holes in metal, the combination of: a standard; bearing means supported by the standard in spaced relation thereto; a rotatable hollow shaft means mounted in said bearing means; a yoke means connected to the lower end of said shaft means and provided with spaced yoke elements and a way means interconnecting said elements; a torch carrier means slidably, adjustably positioned on said way means and extending therebelow, said carrier means being adapted to support a torch; means for supplying fuel to said torch along the axis of rotation of said yoke means and comprising a non-rotatable hollow member mounted at the top of said shaft means in communication with the interior thereof, said non-rotatable member having longitudinally spaced inlet ports for fuel; and an inner tubular member within said hollow shaft means in spaced relation thereto and extending into said non-rotatable member, said inner tubular member having a sealing head positioned between said inlet ports and having a passageway in communication with one of said inlet ports, the other of said inlet ports being in communication with the space between said shaft means and said inner tubular member, said shaft means and said inner member being provided with outlet ports adapted to be connected to said torch means, said shaft means and said inner member being rotatable together upon rotation of said yoke means.

References Cited in the file of this patent

UNITED STATES PATENTS

| | | |
|---|---|---|
| 1,176,584 | Madgett | Mar. 21, 1916 |
| 2,377,844 | Stone | June 5, 1945 |
| 2,424,286 | Robbins | July 22, 1947 |
| 2,463,408 | Millis | Mar. 1, 1949 |
| 2,499,938 | Ward | Mar. 7, 1950 |
| 2,580,398 | Braswell | Jan. 1, 1952 |

FOREIGN PATENTS

| | | |
|---|---|---|
| 232,264 | Germany | Mar. 10, 1911 |